United States Patent [19]
Inoue

[11] 3,904,099
[45] Sept. 9, 1975

[54] INFORMATION RETRIEVAL SYSTEM
[75] Inventor: Shunzo Inoue, Tokyo, Japan
[73] Assignee: Canon Kabushiki Kaisha, Tokyo, Japan
[22] Filed: May 22, 1974
[21] Appl. No.: 472,465

[30] Foreign Application Priority Data
May 28, 1973 Japan.............................. 48-59561

[52] U.S. Cl. ..................... 226/33; 226/49; 226/134
[51] Int. Cl.²......................................... B65H 23/18
[58] Field of Search ........ 226/33, 49, 134, 135, 136

[56] References Cited
UNITED STATES PATENTS
3,572,565  3/1971  Steggall................................ 226/33
3,733,018  5/1973  Breimayer......................... 226/33 X

*Primary Examiner*—Richard A. Schacher
*Attorney, Agent, or Firm*—Fitzpatrick, Cella, Harper & Scinto

[57] ABSTRACT

An information retrieval system is provided with first and second detectors for detecting a frame and group marks located at one side of the recorded film band, a counter for counting the detecting marks and a recorded band feeding apparatus connected to the counter to receive a control signal therefrom. The counter counts down the predetermined value being set, and when the counter has counted the group marks in number equal to the number of the predetermined number of frames, the counter produces a control signal to reduce the feeding speed of the feeding apparatus and simultaneously starts to count the number of frames. Then, in order for the counter to count down the number of frames overrun, the band feeding apparatus transfers the recorded band in the reverse direction and thereafter, when the counter has counted the number of frames which have overrun, then the band feeding apparatus halts the recorded band.

4 Claims, 8 Drawing Figures

PATENTED SEP 9 1975  3,904,099

INFORMATION RETRIEVAL SYSTEM

BACKGROUND OF THE INVENTION

1. Field of the Invention

This invention relates to an information retrieval system which can automatically retrieve the desired information frame from a long film on which is recorded information.

2. Description of the Prior Art

In recent years, microfilms have seen a wide range of applications because of their capacity to hold a large amount of information, densely, in a narrow space. For example, a variety of documents such as technical literature, patent specifications, data, catalogues, and news papers have been packed in microfilms for storage.

To utilize the microfilms, on which is recorded a large volume of information, however, it is necessary to provide a method of retrieving the recorded information.

So far, for the purpose of retrieving information recorded on the microfilm, the method consists in providing a retrieval mark for signals on the outside of each information frame, counting the mark when feeding the microfilm to count the number of frames fed, and comparing the number of frames counted with the frame number, thus retrieving the desired frame. However, with such a method which retrieves the information by way of a frame unit, where it is intended to retrieve a group of information frames, i.e., a group unit composed of a series of a plurality of information frames, it is necessary to inspect the relationship between the frame to be retrieved or already retrieved with the information group by means of a particular index before or after the retrieval of the frame unit, or otherwise, it is necessary to provide between adjacent frames a retrieval code by way of a white-black bit pattern which represents a coded information frame and a coded literature unit, thereby reading the retrieval code to retrieve the information in the group unit.

With the former method, which needs a particular index and a comparison of the relationship between respective frame and frames groups, the retrieval operation becomes complex and clumsy, requiring a great deal of time for retrieval and still presenting the probability of retrieving erroneous frames. With the latter method which performs retrieval in a group unit by recording complex retrieval codes, the photo-taking of the retrieval codes becomes very troublesome, and in addition, it results in a large and complex apparatus for retrieving the complex retrieval codes.

SUMMARY OF THE INVENTION

Therefore, the object of this invention is to provide an information retrieval system which eliminates the aforementioned shortcomings.

Another object of this invention is to provide an information retrieval system which can automatically retrieve information in a group unit from a series of related information frames.

A further object of this invention is to provide an information retrieval system which can perform information retrieval in frame units and group units, independently, and halt the desired frame or frame group at a determined position.

BRIEF DESCRIPTION OF THE DRAWINGS

FIGS. 3 (A) and (B) show the front view of the microfilm that is used in the present invention.

DESCRIPTION OF THE PREFERRED EMBODIMENTS

A concrete example of this invention is illustrated below with reference to the drawings. With regard to FIG. 1, numeral 1 represents a casing of the reader printer, 2 is a screen on which will be projected the image of the film, 3 is a film-supply magazine containing a long roll of microfilm, and 4 is a take-up reel. 5 is a film guide which forms a path for passing the microfilm F, 6 is a projector lens positioned above the guide 5, and $7_1$ and $7_2$ are guide rollers.

Figure 1:
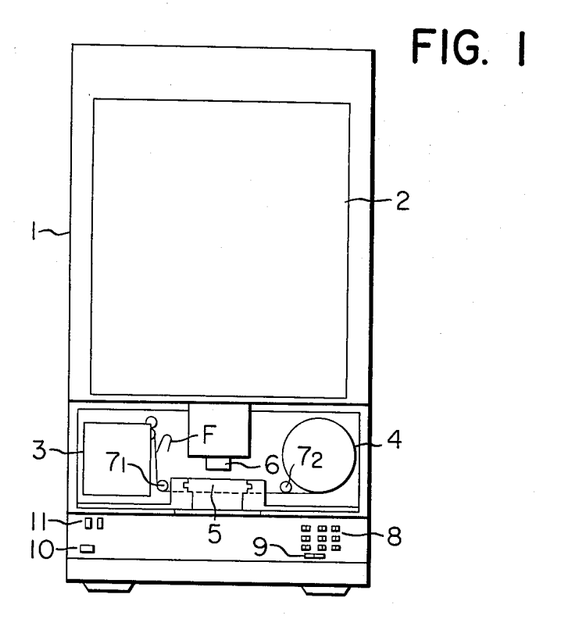
FIG. 1 is a front view of the reader printer to which is applied the information retrieval system of the present invention.

The front panel of the casing 1 is equipped with a group of retrieval buttons 8, which direct the retrieval number, a switch 9 to change over between frame retrieval and group retrieval, a power switch 10, and a printer button 11.

Figure 2:
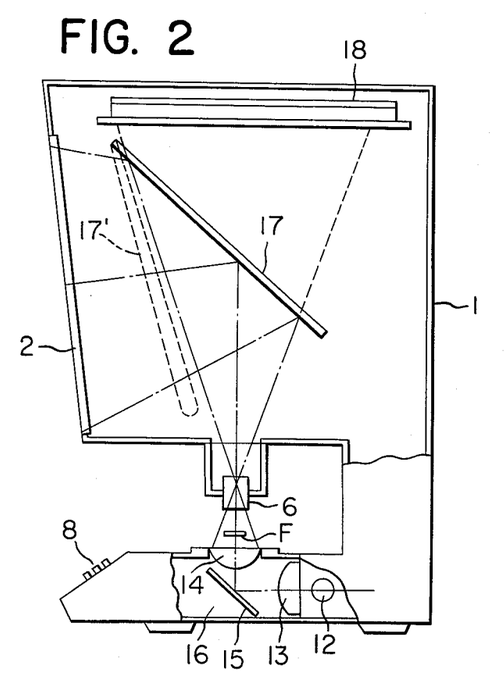
FIG. 2 is a partially cut-away side view of the printer of FIG. 1.

Inside the casing are arranged, a light-source system 16 composed of a light-source lamp 12, condenser lenses 13 and 14, and a reflector mirror 15, as shown in FIG. 2; the beam of light from the light-source lamp 12 is irradiated onto the microfilm F. On the upper side of the casing 1 are positioned a rotatable mirror 17 and a printer 18. The light beam, which has been transmitted through the microfilm F, passes through the projector lens 6, is reflected by mirror 17 and projected onto the screen 2. Therefore, the image of the film placed in the light irradiation position is enlarged and projected on the screen 2, and observed.

By rotating the mirror 17 toward the screen, to the position represented by the broken line 17', the image of the film is irradiated to the printer 18 where the projected image, being enlarged is copied onto the photosensitive paper.

Figure 3A:
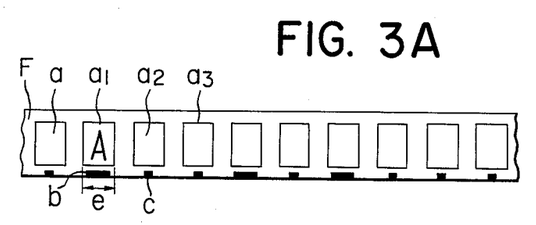
Figure 3B:
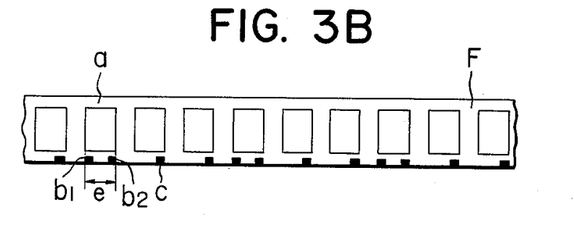
Figure 4:
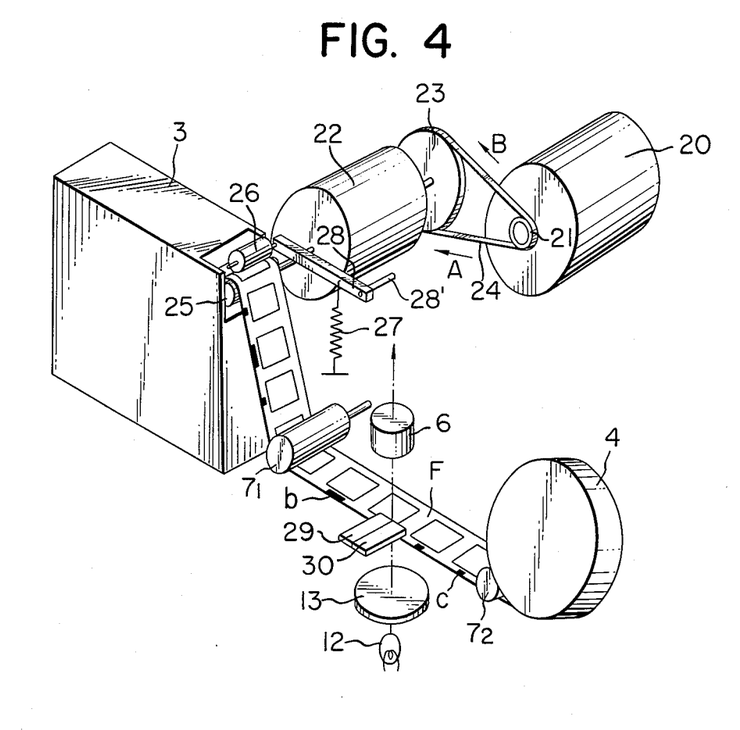
FIG. 4 is a perspective view of the major construction of the embodiment of the present invention shown in FIG. 1.

FIGS. 3 (A) and (B) represents a microfilm that is used in this invention. In FIG. 3 (A), symbol F represents an elongated microfilm, $a$ is a frame on the film F, on which is recorded a series of bits of information, $b$ is a group retrieval mark allocated to the first frame of a series of related frame groups, and $c$ is a frame retrieval mark allocated to each frame at the same position except for the frames on which is allocated said group retrieval mark. Here, let it be supposed that a series of frames $a_1$, $a_2$, and $a_3$ constitute a group of related information frames, then a group retrieval mark $b$ is allocated to one of these groups, e.g., to the first frame $a_1$. Individual retrieval marks $b$, $c$ are attached in a row on one side of the film F, and the group retrieval mark $b$, unlike the frame retrieval mark, has a greater width than two times that of the frame retrieval mark $c$ in the direction of film feeding. FIG. 3 (B) represents another embodiment of the microfilm; the group retrieval mark $b$, unlike the aforesaid embodiment, consists of two marks $b_1$ and $b_2$, maintaining a predetermined clearance in the direction of film feeding. Individual marks $b_1$ and $b_2$ may be of the same shape as the frame retrieval mark $c$. FIG. 4 shows the film feeding part of the microfilm reader for effecting the system of this invention using the microfilm shown in FIG. 3, and in which an endless belt 24 is run around the pulley 21 attached to the rotary shaft of the drive motor 20 and the pulley 23 attached to a brake mechanism 22. Near the film exit of the film-supply magazine are placed a capstan roller 25 and a pinch roller 26, so that the rotation of the capstan roller 25 pulls the film out of the magazine. The drive force of the motor 20 is transmitted to the capstan roller 25 via brake mechanism 22. If the brake mechanism 22 works by a signal, mentioned later, the rotation of the capstan roller 25 is stopped and the film is stopped. Pinch roller 26 is rotatably held at the end of the arm 28, which rotates counterclockwise with the support shaft 28 as a center due to a spring 27, and pinch roller 26 is always in press contact with the capstan owing to the pulling force of the spring 27. In the film feeding path are placed a pair of photoelectric conversion elements 29 and 30 in the direction of film feeding; the clearance, between said pair of photoelectric conversion elements 29 and 30, is shorter than the lateral width $l$ of the group mark $b$ or the lateral width of the projected image of said mark $b$, or the distance $l'$ between the two ends of the group marks $b_1$, $b_2$ or the distance of its projected image, and is wider than the lateral width of the frame retrieval mark $c$ or the lateral width of its projected image.

That is, upon feeding the film F, when the pair of photoelectric conversion elements 29 and 30 receive a frame mark, the two elements do not produce signals simultaneously but produce detection signals intermittently, and when said two elements receive a group mark, they produce the detection signals, simultaneously.

Figures 5, 7:
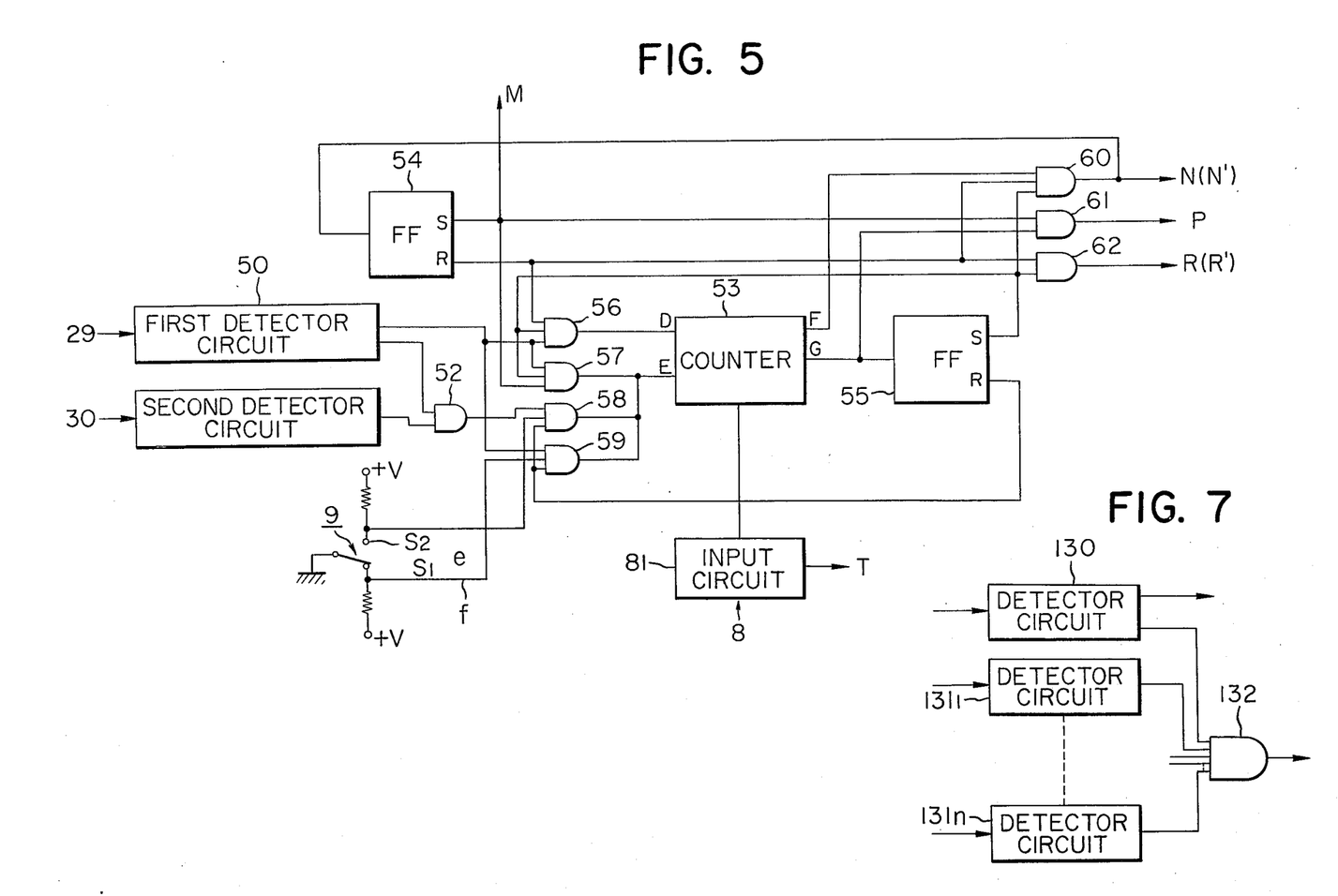
FIG. 5 is a control circuit diagram of the embodiment shown in FIG. 1.
FIG. 7 shows another electrical circuit diagram of the retrieval system of the present invention.

FIG. 5 shows a control circuit for performing the retrieval operation, in which 50 and 51 are first and second detector circuits for receiving detection signals produced a pair of photoelectric conversion elements 29 and 30, $8_1$ is an input circuit for receiving a retrieval number which the operator has called for by way of the group of retrieval buttons 8, 53 is a counter, 54 and 55 are flip-flop circuits, 52, 56 to 62 are AND gates, and 9 is a switch to change over before frame retrieval and group retrieval. The output of the AND gate 56 is fed to the input line D of the counter 53, and the outputs of the AND gates 57, 58 and 59 are all fed to the input line E of the counter 53. The outputs of the first and the second detection circuits 50 and 51 are both connected to the input of the AND gate 52, and the output of the first detection circuit is further connected to the input of the AND gates 56 and 59. The output line F of the counter 53 is connected to the input of an AND gate 60, and the other output line G of the counter 53 is connected to the input of an AND gate 61 and to the set input terminal of the flip-flop 55, respectively. The set output terminal of flip-flop 55 is connected, respectively, to the inputs of the AND gates, 56, 57, 60 and 62, and the reset output terminal of the flip-flop 55 is connected to the inputs of the AND gates 58 and 59, respectively. The output of the AND gate 60 is connected to the set input terminal of the flip-flop 54, the set output terminal of the flip-flop 54 is connected to the inputs of the AND gates 57 and 61, respectively, and the reset output terminal of the flip-flop 54 is connected to the inputs of the AND gates 56, 60 and 62, respectively.

Figure 6:
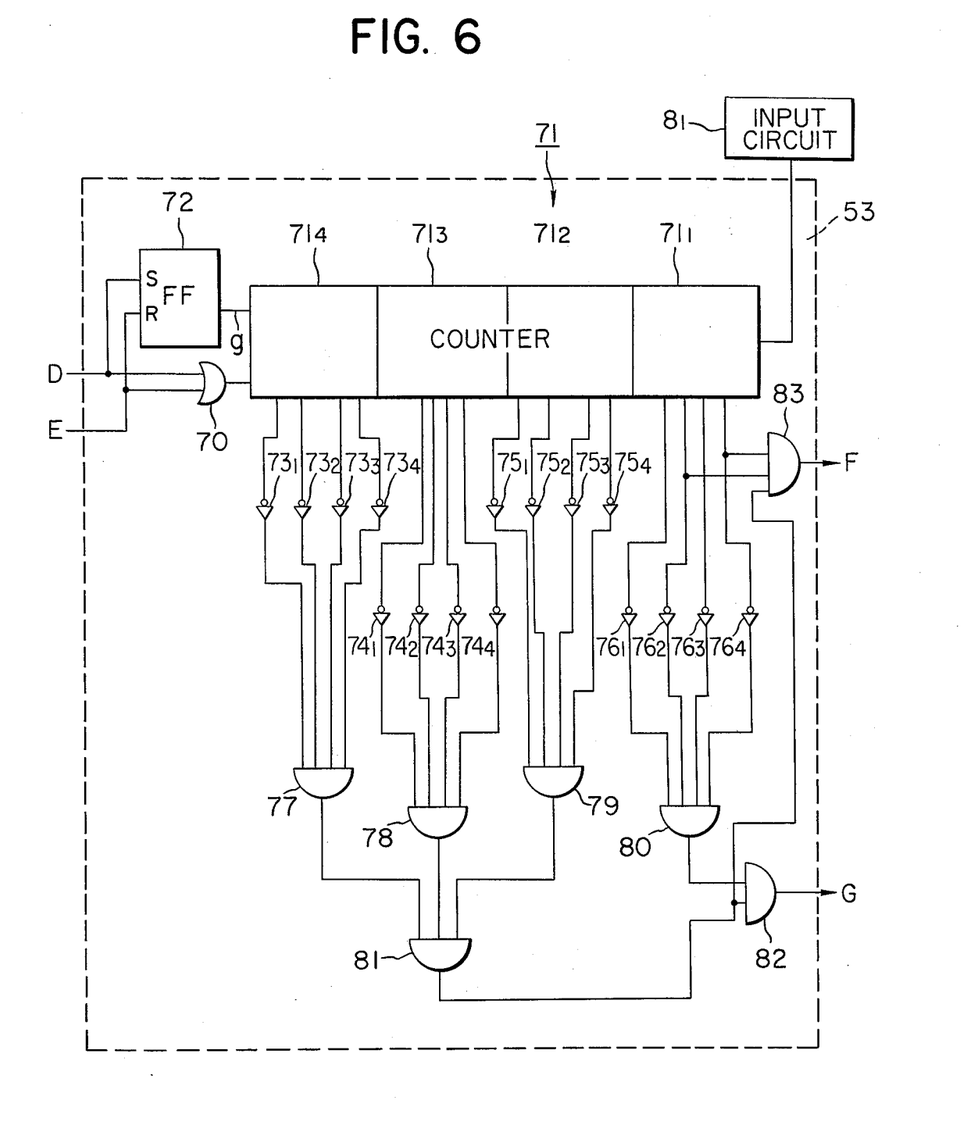
FIG. 6 is an electrical circuit diagram of the counter shown in FIG. 5.

If the contact piece of the switch 9 is contacted to the contact $e_1$, a signal ONE is fed to the input line $e$ of the AND gate 58 and a signal ZERO is sent to the input line $f$ of the AND gate 59. If the contact piece is switched to the contact point $S_2$, a signal ZERO is sent to the AND gate 58 and a signal ONE is fed to the AND gate 59. When the pair of photoelectric conversion elements 29 and 30 detect a frame mark, a first detection signal ONE is introduced from the first detection circuit 50, and when said elements 29 and 30 detect the group mark, a signal ONE is supplied from the first and the second detector circuits simultaneously, and the second direction signal ONE is introduced from gate 52. If no mark is detected, the signal from these detector circuits will be ZERO. When the flip-flops 54 and 55 are in the set state, the output signal from the set output terminal will be ONE and the output signal from the reset output terminal will be ZERO. Also, when the flip-flops 54 and 55 are in the reset state, the output signal from the set output terminal will be ZERO and the output signal from the reset output terminal will be ONE. When the input signals are ONE, the respective AND gates will open to introduce the signal ONE. FIG. 6 shows a concrete example of the counter, in which 70 represents an OR gate circuit, 71 represents a counter circuit, in which $71_1$ stands for the last or smallest digit, $71_2$ denotes the second digit, $71_3$ shows the third digit, and $71_4$ represents the largest digit; numbers of the order of four digits can be counted. Also in FIG. 6, 72 is a flip-flop, $73_1 - 73_4, 74_1 - 74_4, 75_1 - 75_4$, and $76_1 - 76_4$ are inverters, and 77, 78 – 83 are AND gate circuits. The set input terminal of flip-flop 72 is connected to the input line D, the reset input terminal is connected to input line E, and the reset output terminal $g$ of the flip-flop is connected to the counter circuit. If each digit of the counter circuit assumes the setpoint value of ZERO, the AND gates 77, 78, 79 and 80 produce the signal ONE, respectively. If the second digit up to the largest digit assume the value of ZERO and the last or the smallest digit assumes the setpoint value "5," the AND gate 83 produces the signal ONE. If the signal entering the input line D of the counter 63 is ONE, the signal of the output line $g$ of the flip-flop 72 is ZERO, and the counter circuit 71 assumes the arithmatically added state. At this time if a signal ONE is introduced from the OR gate 70 to the counter circuit 71, the counter circuit 71 counts this signal. When the signal entering the input line E is ONE, the signal of the reset output terminal $g$ of the flip-flop becomes ONE, and the counter circuit 71 assumes the arithmatically reduced state. At this moment if the signal ONE is introduced from the OR gate 70 to the counter circuit 71, the counter circuit 71 reduces this signal. If the retrieval number is introduced to the input circuit $8_1$ by the operation of the retrieval button group 8, the retrieval number is shifted toward the left successively and set to the counter circuit 71. Before the retrieval is operated, the flip-flops 54, 55, and 72 assume the set state, so that the signal of the reset output terminal $g$ of the flip-flop 72 becomes ONE, and the counter circuit 71 assumes the arithmetically reduced state.

The retrieval operation is illustrated below with reference to a particular case. Let it be supposed that the case of the film F shown in FIG. 3 is being used, in order to retrieve literature composed of a group of frames $a_1$, $a_2$ and $a_3$ then, first the film F in the film-supply magazine 3 is passed through the film-feeding path and anchored to the take-up reel 4, and the power button 10 is pressed. Next, the contact piece of the switch 9 is connected to the contact point $S_1$ (position shown in FIG. 5) to change to the group retrieval. Let it be supposed that the number of the group mark $b$, i.e., the literature number, is 20 from the starting position up to frame $a_1$ of the film. By pressing the retrieval button group 8 to enter the retrieval number "20" into the input circuit $8_1$, the number 20 is set to the counter circuit 71. Next, by pressing the retrieval initiating button of the retrieval button group 8, the input circuit 8 produces a motor drive signal T. The drive signal T causes the motor 20 to rotate; the belt 24 is turned at high speed in the direction of arrow A, causing the capstan roller 25 and pinch roller 26 to rotate, and the film F is fed at a high speed.

As the pair of photoelectric conversion elements 29 and 30 receive optical signals from the frame mark $c$ and the group mark $b$ with the feed of film, an electric signal ONE is produced from the detector circuits 50 and 51, respectively. When a frame mark $c$ is detected, the first detector circuit 50 produces a first detection signal, which, however, cannot pass through the AND gate 56, as the flip-flop 55 is in the reset state. When the group mark $b$ is detected, the two detector circuits 50 and 51 produce the signals simultaneously, and AND gate 52 produces the second detection signal. Since the flip-flop 55 is in the reset state and the contact piece of the switch 9 is in contact with the contact point $S_1$, the second detection signal, which is fed to the AND gate 58 at the time when the group mark $b$ is detected, causes the AND gate 58 to open; the second detection signal is fed to the counter circuit 71 through the OR gate 70. At this moment, the counter circuit 71 assumes an arithmetically reduced state, and hence, the signal is reduced through the counter circuit 71, and changes the value 20 which has been set to the counter circuit 71 to 19.

As the pair of photoelectric conversion elements 29 and 30 detect the group mark $b$ with the transfer of the film, the counted value of the counter circuit 71 is gradually reduced. If 20 units of second detection signals are fed to the counter circuit 71, i.e., if the group marks from the starting position up to the $a_1$ frame are counted, the counted value of the counter circuit 71 becomes ZERO. Therefore, the digits $71_1$, $71_2$, $71_3$ and $71_4$ of the counter circuits 71 assume the setpoint value ZERO, causing the AND gates 77, 78, 79 and 80 to open, and the AND gates 81 and 82 to open, so that the signal ONE is produced from the AND gate 82, is i.e., from the output line G of the counter 53. This signal is fed to the flip-flop 55 and the AND gate 61, respectively, and sets the flip-flop 55. Since the flip-flop 54 has been in the reset state, the flip-flop 55, which is set, causes the AND gate 62 to open; the motor-stop signal R is produced by the AND gate 62. The motor-stop signal R is fed to the motor 20 causing it to be inoperative; and then the motor is stopped. Since the capstan roller 25 and pinch roller 26 continue to rotate owing to their inertia even after the motor 20 has stopped, the film after a desired group mark is detected continues due to its speed and overruns beyond its determined mark detection position.

The flip-flop 55, on the other hand, causes the AND gate 58 to close. But since the flip-flop 54 assumes the reset state, the first detection signal when the frame mark $c$ is detected is fed to the AND gate 56 and opens it. The first detection signal is fed to the countercircuit 71 through the OR gate 70. At this moment, the AND gate 56, which is opened, causes the output signal of the flip-flop 72 to turn to ZERO; the counter circuit 71 assumes the added state and the signal ONE from the OR gate 70 is added by the counter circuit 71. As the photoelectric conversion element 29 detects the frame mark $c$ and the group mark $b$ as a result of the film which has overrun, the counted value of the counter circuit 71 is added. After the overrun, if the last or the smallest digit $71_1$ of the counter circuit 71 reads the setpoint value 5, and the other digits $71_2$, $71_3$ and $71_4$ read ZERO, in other words, if the film has run over by 5 frames, the signal ONE is produced from the AND gate 83 (i.e., from the output line F of the counter 53). This signal is sent to the AND gate 60. Since the flip-flop 55 is in the set state and the flip-flop 54 is in the reset state, the AND gate 60 is opened and produces a brake signal N. The signal N is sent to the brake mechanism 22 to cause it to become operative; then the rotation of the capstan roller 25 is stopped and the film F is halted. The brake signal N is also sent to the flip-flop 54 to set it, so that the set output terminal of the flip-flop 54 produces the signal, ONE. This signal which serves as a reverse signal M is sent to the motor 20, so that the motor 20 is rotated again; the belt this time is driven in the direction of arrow B at a low speed. At this moment, the flip-flop 54, which is set causes the AND gate 60 to close, and the brake mechanism 22 is made inoperative.

In this way, the film F is transferred in the direction opposite to the aforementioned feeding direction; and the film is transferred back into the film-supply magazine 3.

Since the flip-flops 54 and 55 are in the set state, if the detection signal ONE, when the group mark $b$ and the frame mark $c$ are detected as a result of the film F being fed reversely, is fed to the AND gate 57, then the AND gate 57 is opened, and the detection signal ONE is sent to the counter circuit 71 via the OR gate 70. At this time, the output signal from the flip-flop 72 is ONE, and causes the counter circuit 71 to assume the reduced state; the signal from the OR gate 70 is reduced in the counter circuit 71. As the photoelectric conversion element 29 detects the group mark $b$ and the frame mark $c$ of the film, which is fed reversely, the counted value of the counter circuit 71 is reduced, gradually.

After the film has reversed, if the counted value of the counter circuit 71 assumes a ZERO value, i.e., if the frames of the number equal to the number of frames overrun is counted, then the AND gates 77, 78, 79 and 80 are opened, and cause the AND gates 81 and 82 to open; the AND gate 82 (output line G of the counter 53) produces a signal ONE which will be sent to the AND gate 61. At this moment, the flip-flop assumes the set state, causing the AND gate 61 to open; the AND gate 61 produces a finish signal P.

The finish signal P is fed to the motor 20 and the brake mechanism 22, to render the motor 20 inoperative as well as to render the brake mechanism 22 operative, so that the film is halted. Also, after the finish signal P is produced, all of the circuits are reset. Therefore, the film F is reversed by the number of frames overrun and is stopped at such a position that the frame $a_1$ is in the desired position. By such operation, the recorded frame of the desired group $a$ is automatically retrieved, and the first frame $a_1$ of the group is projected onto the screen 2 or printer 8 to be observed or printed.

Also, according to the present invention, it is possible not only to effect the retrieval in a group unit as mentioned above, but to effect retrieval in a frame unit, as well. In effect, where it is intended to effect the frame retrieval using the microfilm shown in FIG. 3 or using a film on which there is a given mark for every frame, the contact piece of the switch 9 may be connected to the contact piece $S_2$ to change the switch 9 from the group retrieval to the frame retrieval. Then, the AND gate 59 will operate in place of the AND gate 58, which operated in the group retrieval. That is, pressed the retrieval button group 8 to set the frame number to be retrieved to the counter circuit 71 via the input circuit $8_1$. Then, if the detection signal ONE, when the frame mark $c$ (and group mark $b$) are detected, is sent to the AND gate 59 with the transfer of the film, the AND gate 59 is opened so that said detection signal ONE is sent to the counter circuit 71 via the OR gate 70. At this moment, the counter circuit 71 is in the reducing state, and the signal is reduced in the counter circuit 71. As the photoelectric conversion element 29 detects the frame mark (and group mark) owing to the film fed, the counted value of the counter circuit 71 is reduced, gradually. As the counted value of the counter circuit 71 reaches the setpoint value ZERO, the motor 20 is rendered inoperative and stops its rotation, but the film tends to overrun due to its inertia. As the succeeding operation is the same as the operation mentioned hereinbefore, further illustration is omitted.

As mentioned above, it is possible to effect frame retrieval by using the film shown in FIG. 3 or using earlier films having only frame marks.

In the foregoing embodiment, the motor 20 is rendered inoperative by the motor-stop signal R when the counter circuit 71 has counted a determined number of marks, but the motor 20 may be so controlled as to change its speed from high speed to low speed in place of being rendered inoperative.

That is, when the counter circuit 71 has counted a determined number of marks, the speed of the motor 20 may be lowered by the motor-speed lowering signal R', which corresponds said motor-stop signal R from the AND gate 62. In this case, the stoppage of motor 20 is effected by the motor-stop signal N' corresponding to said brake signal N from the AND gate circuit 60. The stop signal N' aids in actuating the brake mechanism 22.

It is also possible to carry out retrieval in the same manner as mentioned above by using a film as shown in FIG. 3 (B), i.e., a film composed of a plurality of code marks in which group marks $b$ are disposed maintaining a determined clearance, in place of using the film shown in FIG. 3 (A).

FIG. 7 shows a detector circuit to be used when the film has a group mark with a plurality of code marks; photoelectric conversion elements of the same number as that of the code marks are placed at such positions as to simultaneously receive the optical signals from the individual code marks, and a plurality of detector circuits 130, $131_1$, $131_2$, − $131_n$ are provided for each of these photoelectric conversion elements. The output of each detector circuit is connected to the input of the AND gate 132 corresponding to said AND gate 52. The output of the detector circuit 130, like the aforementioned embodiment, is connected to the input of the AND gates 56, 59, and the output of the AND gate 132 is connected to the input of the AND gate 58. Upon feeding the film, all of the detector circuits produce the signals simultaneously, when a group mark is received, and as a result, the second detection signal is produced from the AND gate 132. If a frame mark is received, at least one detector circuit fails to produce the detection signal, thus making a distinction over the group marks. That is, when a frame mark is received, the detector circuit 130 produces a first detection signal.

As mentioned hereinbefore, according to this invention, it is possible to carry out the information retrieval by group units having a relation to the retrieval by frame units, by way of a simple mark without the necessity of providing a complex retrieval mark on the film, as well as to stop the desired recording frame at a determined position.

The foregoing description dealt with the mechanism of this invention with reference to the accompanying drawings, but it should be noted that this invention is not limited to such an embodiment, only, but may be modified into a variety of forms without departing from the scope of the claims.

I claim:

1. An information retrieval system to selectively retrieve the desired recorded frame from a long recorded band, said system comprising;

a group-retrieval mark allocated to at least one of a series of related frame groups on the recorded band having a series of information-recorded frames;

a frame retrieval mark allocated to each frame except those to which is allocated said group retrieval mark, said group mark and frame mark being allocated to the same side on the recorded band and having different shapes;

a light-source means to irradiate each mark on the recorded band;

a pair of photoelectric conversion elements to receive optical signals from each mark when the recorded band has traveled, said pair of photoelectric conversion elements being so designed as to produce intermittently a first detection signal when a frame mark is received and produce second detection signals simultaneously when a group mark is received;

a gate means which receives individual detection signals produced by said pair of photoelectric conversion elements, in order that either one of the detection signals may be passed through selectively;

a counter means connected to said gate means, in order to count the detection signals which have passed through the gate means and to produce a control signal when the counted value has reached a predetermined value;

a control means connected to said counter means, which responsive to the counted value of the counter means controls the opening and closure of the gate means, in order to pass through particular detection signals; and a recorded band feeding means which is connected to said counter means and receives control signals, said feeding means being so designed as to reduce the feeding speed of the recorded band and allow the recorded bandn to overrun when the counter means has counted a number of group marks equal to the number of the predetermined recorded frame, and feeds the recorded band in the reverse direction when said counter means has counted the predetermined number of frames which have overrun by way of frame marks and group marks, and then halts the recorded band when the counter means has counted the number of frames which have overrun.

2. An information retrieval system according to claim wherein the gate means consists of a gate circuit, said control means has a flip-flop circuit and opens and closes the gate circuit so as to feed the selected detection signal to the counter means responsive to the counted value of the counter means.

3. An information retrieval system according to claim 2 wherein said counter means has a circuit to count the detection signal fed from the gate circuit and a gate circuit which produces a control signal responsive to the counted value of the counter circuit.

4. An information retrieval system according to claim 1 wherein there is provided a switch means connected to said gate means in order to effect change between the frame retrieval and group retrieval.

* * * * *

UNITED STATES PATENT OFFICE
CERTIFICATE OF CORRECTION

Patent No. 3,904,099          Dated September 9, 1975

Inventor(s) SHUNZO INOUE

It is certified that error appears in the above-identified patent and that said Letters Patent are hereby corrected as shown below:

Column 1, line 42, "frames groups" should read --frame groups--;

Column 2, line 50, "represents" should read --represent--;

Column 3, line 43, "a pair" should read --by a pair--;

Column 3, line 48, "before" should read --between--;

Column 4, line 6, "$e_1$" should read --$S_1$--;

Column 4, line 17, "direction" should read --detection--;

Column 4, lines 17 and 18, "gate 52" should read --the AND gate 52--;

Column 5, line 54, "is i.e." should read --i.e.--

Column 6, line 56, "is counted" should read --are counted--;

Column 7, line 18, "That is, pressed" should read --That is,--;

Column 7, line 19, "group 8 to set" should read --group 8 is pressed--;

Column 7, line 49, "corresponds said" should read --corresponds to said--;

Column 9, line 3, Claim 1, "bandn" should read --band--;

Column 9, line 3, Claim 2, "claim" should read --claim 1--;

Signed and Sealed this ninth Day of December 1975

[SEAL]

Attest:

RUTH C. MASON          C. MARSHALL DANN
*Attesting Officer*          *Commissioner of Patents and Trademarks*